(12) United States Patent
Lee et al.

(10) Patent No.: US 11,502,606 B2
(45) Date of Patent: Nov. 15, 2022

(54) DIRECT-CURRENT (DC) VOLTAGE CONVERSION DEVICE

(71) Applicants: SUZHOU MEAN WELL TECHNOLOGY CO., LTD., Suzhou (CN); MEAN WELL ENTERPRISES CO., LTD., New Taipei (TW)

(72) Inventors: Yu-Hsiang Lee, New Taipei (TW); Chia-Hong Kuo, New Taipei (TW)

(73) Assignees: Suzhou Mean Well Technology Co., Ltd., Suzhou (CN); Mean Well Enterprises Co., Ltd., New Taipei (TW)

( * ) Notice: Subject to any disclaimer, the term of this patent is extended or adjusted under 35 U.S.C. 154(b) by 24 days.

(21) Appl. No.: 17/335,652

(22) Filed: Jun. 1, 2021

(65) Prior Publication Data
US 2022/0255427 A1    Aug. 11, 2022

(30) Foreign Application Priority Data
Feb. 8, 2021    (CN) .......................... 202110171743.5

(51) Int. Cl.
    H02M 3/158    (2006.01)
    H02M 3/07     (2006.01)
    H02M 3/00     (2006.01)

(52) U.S. Cl.
    CPC ............. H02M 3/158 (2013.01); H02M 3/01 (2021.05); H02M 3/07 (2013.01)

(58) Field of Classification Search
    CPC ........... H02M 3/158; H02M 3/01; H02M 3/07
    See application file for complete search history.

(56) References Cited

U.S. PATENT DOCUMENTS

| 2014/0153289 A1* | 6/2014 | Kao ................... H02M 3/3376 |
| | | 363/17 |
| 2015/0288289 A1* | 10/2015 | Qu ................... H02M 3/33592 |
| | | 363/17 |

* cited by examiner

*Primary Examiner* — Adolf D Berhane
*Assistant Examiner* — Afework S Demisse
(74) *Attorney, Agent, or Firm* — Rosenberg, Klein & Lee

(57) ABSTRACT

A direct-current (DC) voltage conversion device includes an energy providing circuit, a first transistor switch, a second transistor switch, a third transistor switch, a fourth transistor switch, and an output capacitor. The first transistor switch is turned on. The second transistor switch and the fourth transistor switch are turned off. The energy providing circuit charges the parasitic capacitance of the second transistor switch. When the third transistor switch is turned on, the parasitic capacitance discharges the output capacitor to establish the same voltage drops across the parasitic capacitance and the output capacitor. After establishing the same voltage drops across the parasitic capacitance and the output capacitor, the parasitic capacitance of the second transistor switch charges the parasitic capacitance of the fourth transistor switch, thereby establishing a zero voltage drop across the fourth transistor switch and achieving zero voltage switching.

10 Claims, 4 Drawing Sheets

DIRECT-CURRENT (DC) VOLTAGE CONVERSION DEVICE

This application claims priority of Application No. 202110171743.5 filed in Mainland China on 8 Feb. 2021 under 35 U.S.C. § 119; the entire contents of all of which are hereby incorporated by reference.

BACKGROUND OF THE INVENTION

Field of the Invention

The present invention relates to a voltage conversion device, particularly to a direct-current (DC) voltage conversion device.

Description of the Related Art

The direct-current (DC)-to-DC converter, also known as a DC-DC converter or a DC transformer, is a circuit or an electromechanical device that converts electrical energy. The DC-to-DC converter can convert DC power into different DC voltages whose power ranges from a very low value (e.g., a small battery) to a very high value (e.g., high voltage conversion). The input voltage and the output voltage of some DC-DC converters have the same reference point, while the input voltage and the output voltage of some DC-DC converters separate from each other.

FIGS. 1(a)-1(d) are schematic diagram illustrating the steps of a rectifying process of a conventional direct-current (DC) voltage conversion device. As illustrated in FIG. 1(a), the DC voltage conversion device 1 includes a switching circuit 10, a transformer 11, a resonant inductor 12, a first transistor switch 13, a second transistor switch 14, a third transistor switch 15, a fourth transistor switch 16, and an output capacitor 17. The transformer 11 receives an input DC voltage Vdc to store energy through the switching circuit 10, thereby charging the parasitic capacitance of the second transistor switch 14. When the first transistor switch 13 and the third transistor switch 15 are turned on and the second transistor switch 14 and the fourth transistor switch 16 are turned off, the parasitic capacitance of the second transistor switch 14 discharges the output capacitor 17, such that voltage drops across the parasitic capacitance of the second transistor switch 14 and the output capacitor 17 are output voltages Vout. A dashed line denotes a discharging path. As illustrated in FIG. 1(b), when the first transistor switch 13 and the third transistor switch 15 are turned off and the second transistor switch 14 and the fourth transistor switch 16 are turned off, the parasitic capacitance of the second transistor switch 14 keeps on discharging the output capacitor 17. The discharging path passes through the parasitic diodes of the first transistor switch 13 and the third transistor switch 15. As illustrated in FIG. 1(c), when the parasitic capacitance of the second transistor switch 14 stops discharging the output capacitor 17, the parasitic capacitance of the second transistor switch 14 discharges the parasitic capacitance of the third transistor switch 15 through the winding of the secondary side of the transformer 11 and the resonant inductor 12, until the voltage drop across the parasitic capacitance of the second transistor switch 14 is zero and the voltage drop across the parasitic capacitance of the third transistor switch 15 is output voltage Vout. As illustrated in FIG. 1(d), the parasitic capacitances of the second transistor switch 14 and the third transistor switch 15 resonate with the winding of the secondary side of the transformer 11 and the resonant inductor 12, such that the voltage drop across the parasitic capacitance of the second transistor switch 14 is the output voltage Vout and the voltage drop across the parasitic capacitance of the third transistor switch 15 is zero. Since the voltage drop across the fourth transistor switch 16 is the output voltage Vout, hard switching occurs to decrease the conversion efficiency and increase the ripple of the output voltage when the fourth transistor switch 16 is turned on.

To overcome the abovementioned problems, the present invention provides a direct-current (DC) voltage conversion device, so as to solve the afore-mentioned problems of the prior art.

SUMMARY OF THE INVENTION

The present invention provides a direct-current (DC) voltage conversion device, which reduces the ripple of the output voltage, noise disturbance, and the voltage-withstanding capabilities of power transistors and increases a full-load efficiency by about 1%.

In an embodiment of the present invention, a direct-current (DC) voltage conversion device includes an energy providing circuit, a first transistor switch, a second transistor switch, a third transistor switch, a fourth transistor switch, and an output capacitor. The energy providing circuit has a first terminal and a second terminal. The energy providing circuit is configured to receive an input direct-current (DC) voltage to store energy. The first transistor switch is coupled between the second terminal and a first output. The first transistor switch is turned on. The second transistor switch is coupled between the second terminal and a second output. The second transistor switch is turned off. The energy providing circuit is configured to use the energy to charge parasitic capacitance of the second transistor switch. The third transistor switch is coupled between the first terminal and the second output. The fourth transistor switch is coupled between the first terminal and the first output. The node of the fourth transistor switch coupled to the first terminal of the energy providing circuit is coupled to the third transistor switch. The fourth transistor switch is turned off. The output capacitor is coupled between the first output and the second output. When the third transistor switch is turned on, the parasitic capacitance discharges the output capacitor to generate a discharging current, and the energy providing circuit receives the discharging current to store energy through the first transistor switch, the output capacitor, and the third transistor switch, thereby establishing same voltage drops across the parasitic capacitance and the output capacitor. After establishing the same voltage drops across the parasitic capacitance and the output capacitor, the third transistor switch is turned off and the parasitic capacitance of the second transistor switch is driven to charge parasitic capacitance of the fourth transistor switch, thereby establishing a zero voltage drop across the fourth transistor switch.

In an embodiment of the present invention, the energy providing circuit includes a current switching circuit and a transformer. The current switching circuit is configured to receive the input DC voltage and convert the input DC voltage into an input direct-current (DC) current. The transformer has a primary side coupled to the current switching circuit. The secondary side of the transformer has the first terminal and the second terminal. The primary side of the transformer is configured to receive the input DC current to store energy and use the energy to charge the parasitic capacitance of the second transistor switch. The winding of the secondary side is configured to receive the charging current to store energy through the first transistor switch, the output capacitor, and the third transistor switch. When the third transistor switch is turned off, the parasitic capacitance of the second transistor switch is driven to charge the parasitic capacitance of the fourth transistor switch through the winding of the secondary side.

In an embodiment of the present invention, the primary side of the transformer has a third terminal and a fourth terminal. The current switching circuit includes a fifth transistor switch, a sixth transistor switch, a seventh transistor switch, and an eighth transistor switch. The fifth transistor switch is coupled between a first input and the third terminal. The sixth transistor switch is coupled between a second input and the third terminal. The seventh transistor switch is coupled between the second input and the fourth terminal. The eighth transistor switch is coupled between the first input and the fourth terminal. The fifth transistor switch, the sixth transistor switch, the seventh transistor switch, and the eighth transistor switch are configured to receive the input DC voltage and convert the input DC voltage into the input DC current through the first input and the second input.

In an embodiment of the present invention, the fifth transistor switch, the sixth transistor switch, the seventh transistor switch, and the eighth transistor switch are N-channel metal-oxide-semiconductor field effect transistors.

In an embodiment of the present invention, the current switching circuit further comprises an input capacitor coupled between the first input and the second input and configured to stabilize the input DC voltage.

In an embodiment of the present invention, the current switching circuit further comprises an active clamped circuit coupled between the first input and the second input and configured to clamp the input DC voltage.

In an embodiment of the present invention, the active clamped circuit comprises a clamping capacitor and a ninth transistor switch. The clamping capacitor is coupled to the ninth transistor switch in series.

In an embodiment of the present invention, the current switching circuit further comprises an input inductor with an end thereof coupled to the first input, and another end of the input inductor is coupled to the active clamped circuit, the fifth transistor switch, and the eighth transistor switch. The fifth transistor switch, the sixth transistor switch, the seventh transistor switch, and the eighth transistor switch are configured to receive the input DC voltage through the input inductor.

In an embodiment of the present invention, the DC voltage conversion device further comprises a resonant inductor coupled between the first terminal and the node. The resonant inductor is configured to receive the charging current to store energy through the first transistor switch, the output capacitor, and the third transistor switch. When the third transistor switch is turned off, the parasitic capacitance of the second transistor switch is driven to charge the parasitic capacitance of the fourth transistor switch through the resonant inductor.

In an embodiment of the present invention, the first transistor switch, the second transistor switch, the third transistor switch, and the fourth transistor switch are N-channel metal-oxide-semiconductor field effect transistors. The parasitic capacitances of the second transistor switch and the second transistor switch are parasitic drain-source capacitances.

To sum up, the DC voltage conversion device keeps on turning on the first transistor switch. When the third transistor switch is turned off, the voltage drop across the fourth transistor switch is zero, thereby achieving zero voltage switching, increasing a full-load efficiency by about 1%, and reducing the ripple of the output voltage, noise disturbance, and the voltage-withstanding capabilities of power transistors.

Below, the embodiments are described in detail in cooperation with the drawings to make easily understood the technical contents, characteristics and accomplishments of the present invention.

DETAILED DESCRIPTION OF THE INVENTION

Figure 1A:
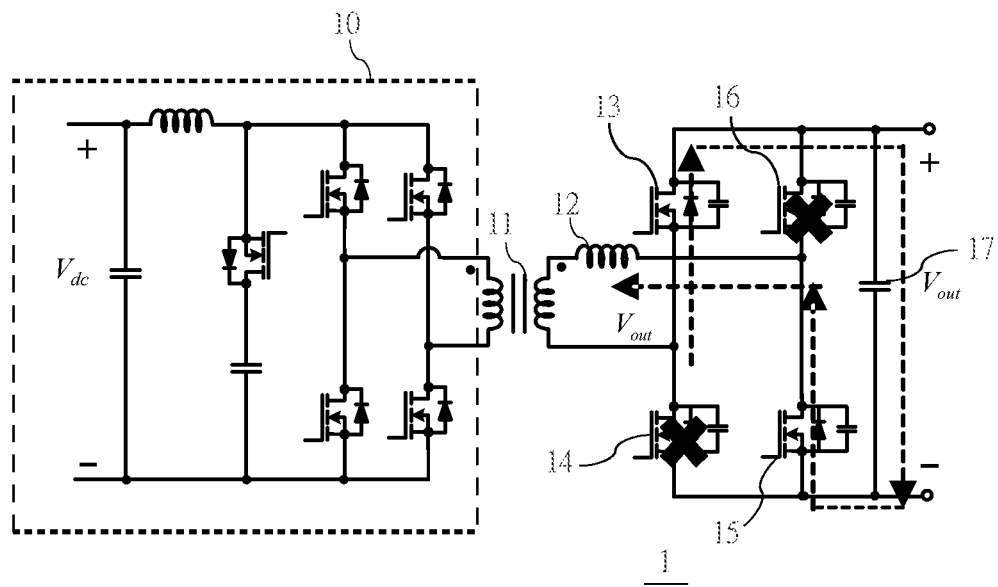
FIGS. 1(a)-1(d) are schematic diagram illustrating the steps of a rectifying process of a conventional direct-current (DC) voltage conversion device.
Figure 1B:
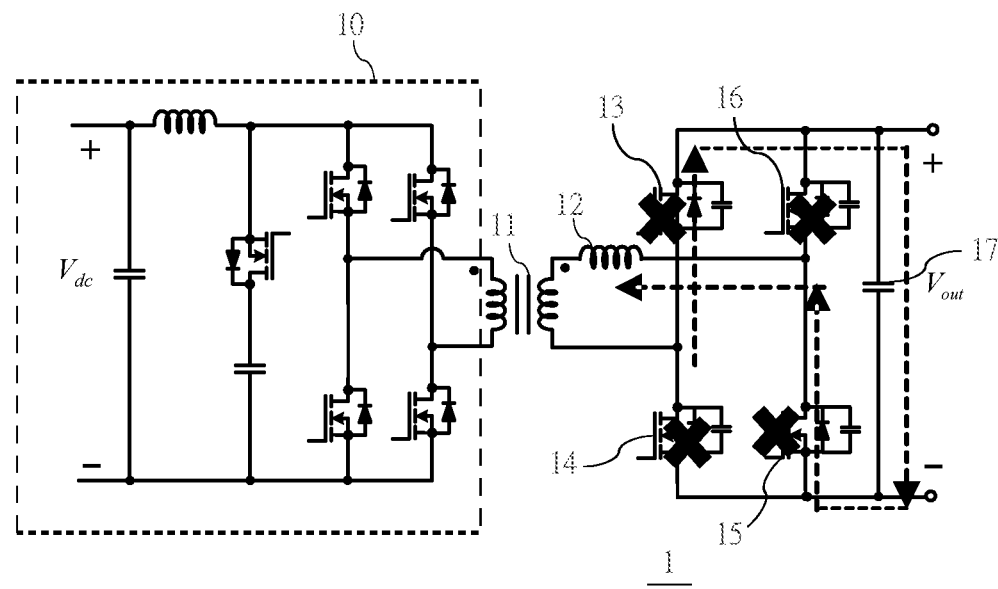
Figure 1C:
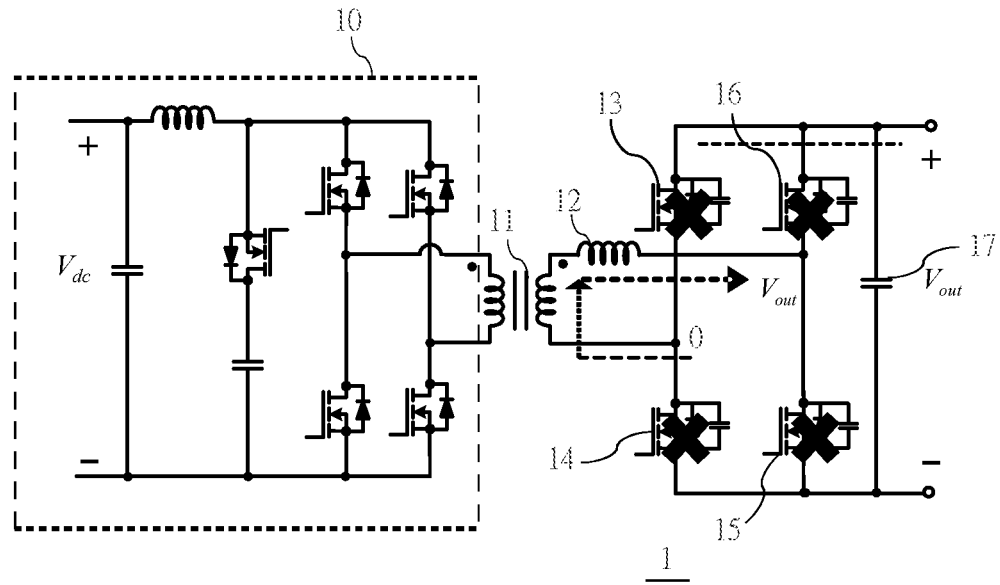
Figure 1D:
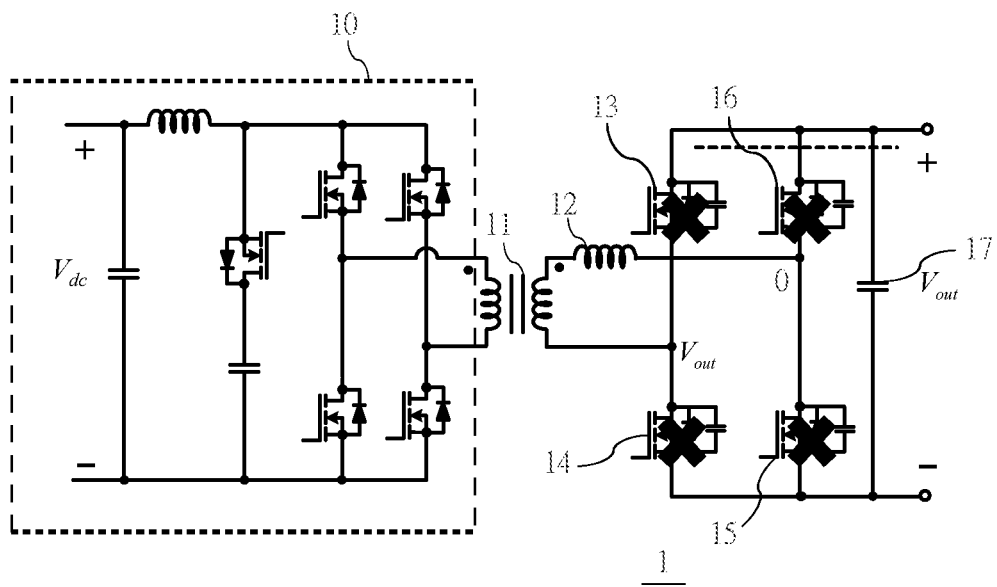

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

Unless otherwise specified, some conditional sentences or words, such as "can", "could", "might", or "may", usually attempt to express that the embodiment in the present invention has, but it can also be interpreted as a feature, element, or step that may not be needed. In other embodiments, these features, elements, or steps may not be required.

Figure 2A:
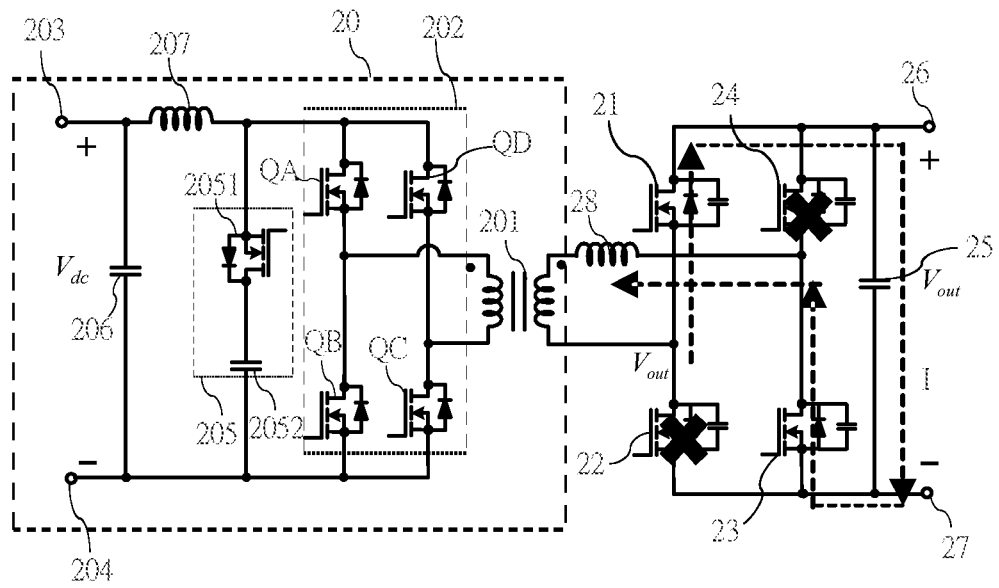
FIGS. 2(a)-2(d) are schematic diagram illustrating the steps of a rectifying process of a direct-current (DC) voltage conversion device according to an embodiment of the present invention.

FIGS. 2(a)-2(d) are schematic diagram illustrating the steps of a rectifying process of a direct-current (DC) voltage conversion device according to an embodiment of the present invention. As illustrated in FIG. 2(a), the DC voltage conversion device 2 includes an energy providing circuit 20, a first transistor switch 21, a second transistor switch 22, a third transistor switch 23, a fourth transistor switch 24, and an output capacitor 25. The first transistor switch 21, the second transistor switch 22, the third transistor switch 23, and the fourth transistor switch 24 are N-channel metal-oxide-semiconductor field effect transistors, but the present invention is not limited thereto. The energy providing circuit 20 has a first terminal and a second terminal, wherein the first terminal is different from the second terminal. The first transistor switch 21 is coupled between the second terminal of the energy providing circuit 20 and a first output 26. The second transistor switch 22 is coupled between the second terminal of the energy providing circuit 20 and a second output 27. The node of the second transistor switch 22 coupled to the second terminal of the energy providing circuit 20 is coupled to the first transistor switch 21. The first output 26 is different from the second output 27. The third transistor switch 23 is coupled between the first terminal of the energy providing circuit 20 and the second output 27. The fourth transistor switch 24 is coupled between the first terminal of the energy providing circuit 20 and the first output 26. The node of the fourth transistor switch 24 coupled to the first terminal of the energy providing circuit is 20 is coupled to the third transistor switch 23. The output capacitor 25 is coupled between the first output 26 and the second output 27.

The energy providing circuit 20 receives an input direct-current (DC) voltage Vdc to store energy. The second transistor switch 22 and the fourth transistor switch 24 are turned off. The first transistor switch 21 is turned on. The energy providing circuit 20 uses the energy to charge the parasitic capacitance of the second transistor switch 22. When the second transistor switch 22 is an N-channel metal-oxide-semiconductor field effect transistor, its parasitic capacitance is a parasitic drain-source capacitance.

When the third transistor switch 23 is turned on, the parasitic capacitance of the second transistor switch 22 discharges the output capacitor 25 to generate a discharging current I. The energy providing circuit 20 receives the discharging current to store energy through the first transistor switch 21, the output capacitor 25, and the third transistor switch 23, thereby establishing the same voltage drops across the parasitic capacitance of the second transistor switch 22 and the output capacitor 25, namely output voltages Vout. The DC voltage conversion device 2 may further include a resonant inductor 28. The resonant inductor 28 is coupled between the first terminal of the energy providing circuit 20 and the node of the fourth transistor switch 24 that is coupled to the first terminal of the energy providing circuit 20 and the third transistor switch 23. The resonant inductor 28 receives the charging current I to store energy through the first transistor switch 21, the output capacitor 25, and the third transistor switch 23.

Figure 2B:
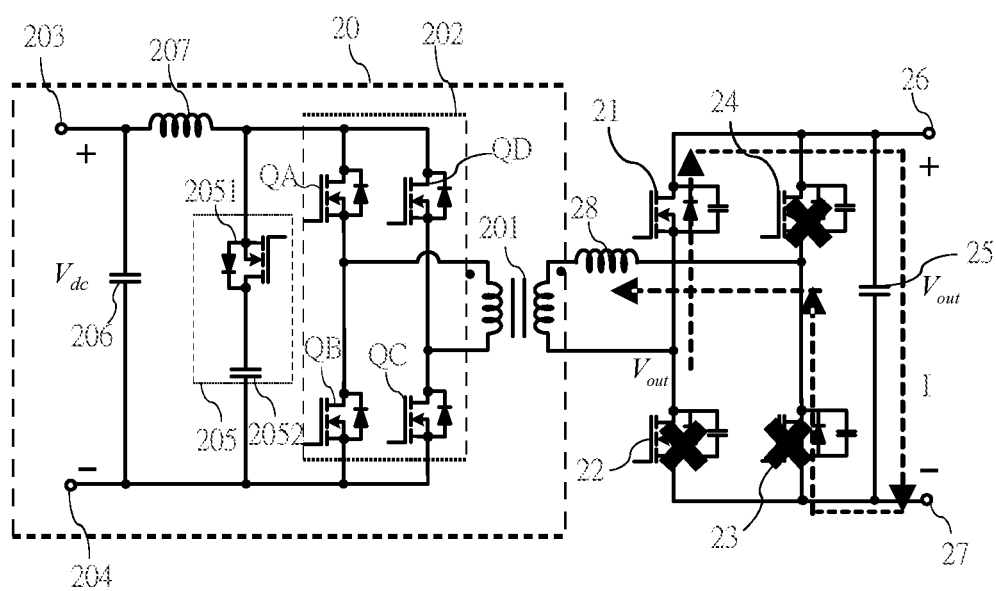

As illustrated in FIG. 2(b), after establishing the same voltage drops across the parasitic capacitance of the second transistor switch 22 and the output capacitor 25, the third transistor switch 23 is turned off. Since the discharging current needs to maintain its original state, the energy providing circuit 20 and the resonant inductor 28 keep on receiving the discharging current I through the first transistor switch 21, the output capacitor 25, and the parasitic diode of the third transistor switch 23 until the discharging current I disappears. When the third transistor switch 23 is an N-channel metal-oxide-semiconductor field effect transistor, the parasitic diode is a parasitic drain-source diode.

Figure 2C:
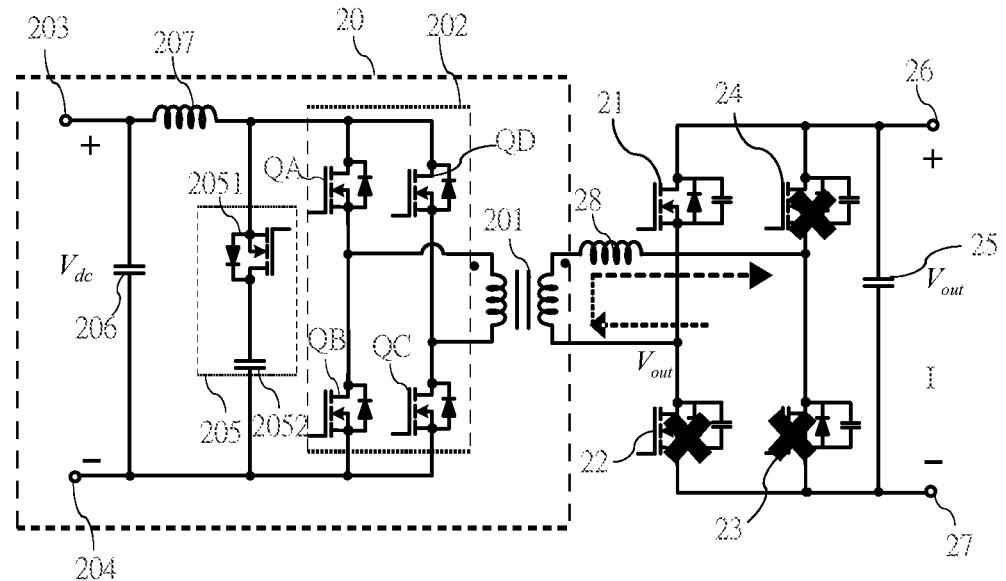

As illustrated in FIG. 2(c), after the discharging current I disappears, the voltage drop across the first terminal and the second terminal of the energy providing circuit 20 drives the parasitic capacitance of the second transistor switch 22 to charge the parasitic capacitance of the fourth transistor switch 24 through the energy providing circuit 20 and the resonant inductor 28, until the same voltage drops across the parasitic capacitances of the second transistor switch 22 and the fourth transistor switch 24 are established. The same voltage drops across the parasitic capacitances of the second transistor switch 22 and the fourth transistor switch 24 are the output voltages Vout. When the fourth transistor switch 24 is an N-channel metal-oxide-semiconductor field effect transistor, its parasitic capacitance is a parasitic drain-source capacitance.

Figure 2D:
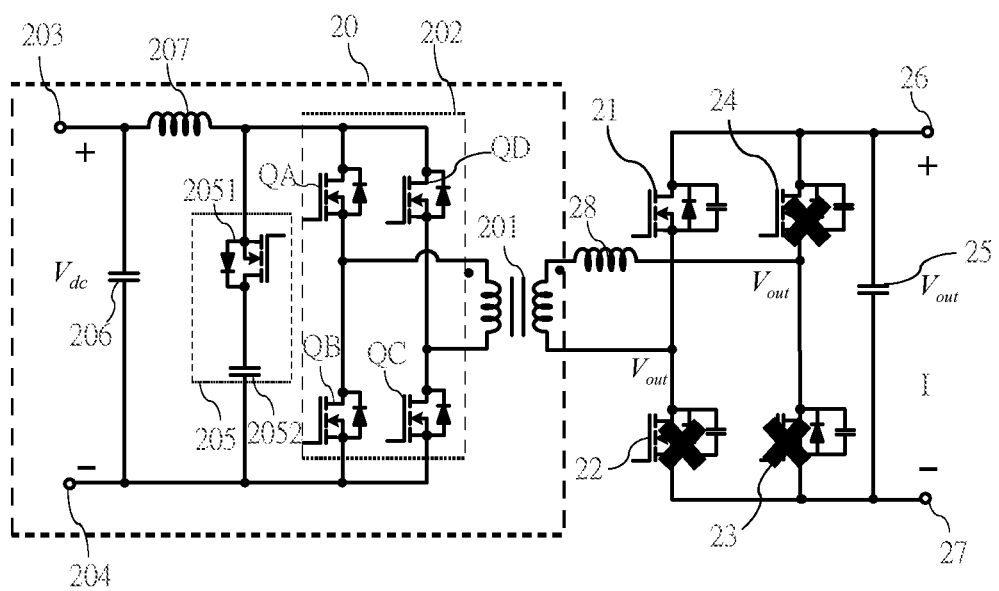

As illustrated in FIG. 2(d), the same voltage drops across the parasitic capacitances of the second transistor switch 22 and the fourth transistor switch 24 are established, which represents a zero voltage drop across the fourth transistor switch 24 is established to reduce the voltage-withstanding capability of the power transistor. As a result, when the fourth transistor switch 24 is turned on, zero voltage switching is achieved, the ripple of the output voltage and noise disturbance are reduced, and a full-load efficiency is increased by about 1%.

Referring to FIGS. 2(a)-2(d), the energy providing circuit 20 is introduced as follows. In some embodiments of the present invention, the energy providing circuit 20 includes a transformer 201, a current switching circuit 202, a first input 203, a second input 204, an active clamped circuit 205, an input capacitor 206, and an input inductor 207. The primary side of the transformer 201 is coupled to the current switching circuit 202. The secondary side of the transformer 201 has the first terminal and the second terminal. The primary side of the transformer 201 has a third terminal and a fourth terminal, wherein the third terminal is different from the fourth terminal. The current switching circuit 202 receives the input DC voltage Vdc and converts the input DC voltage Vdc into an input direct-current (DC) current. As illustrated in FIG. 2(a), the primary side of the transformer 201 receives the input DC current to store energy and uses the energy to charge the parasitic capacitance of the second transistor switch 22. The winding of the secondary side receives the charging current I to store energy through the first transistor switch 21, the output capacitor 25, and the third transistor switch 23. As illustrated in FIG. 2(c) and FIG. 2(d), when the third transistor switch 23 is turned off, the parasitic capacitance of the second transistor switch 22 is driven to charge the parasitic capacitance of the fourth transistor switch 24 through the winding of the secondary side. The active clamped circuit 205 is coupled between the first input 203 and the second input 204 and configured to clamp the input DC voltage Vdc. The input capacitor 206 is coupled between the first input 203 and the second input 204 and configured to stabilize the input DC voltage Vdc.

In some embodiments of the present invention, the current switching circuit 202 includes a fifth transistor switch QA, a sixth transistor switch QB, a seventh transistor switch QC, and an eighth transistor switch QD. The fifth transistor switch QA, the sixth transistor switch QB, the seventh transistor switch QC, and the eighth transistor switch QD may be N-channel metal-oxide-semiconductor field effect transistors, but the present invention is not limited thereto. The fifth transistor switch QA is coupled between the first input 203 and the third terminal of the transformer 201. The sixth transistor switch QB is coupled between the second input 204 and the third terminal of the transformer 201. The seventh transistor switch QC is coupled between the second input 204 and the fourth terminal of the transformer 201. The eighth transistor switch QD is coupled between the first input 203 and the fourth terminal of the transformer 201. An end of the input inductor 207 is coupled to the first input 203 and another end of the input inductor 207 is coupled to the active clamped circuit 205, the fifth transistor switch QA, and the eighth transistor switch QD. The active clamped circuit 205 may include a ninth transistor switch 2051 and a clamping capacitor 2052. The clamping capacitor 2052 is coupled to the ninth transistor switch 2051 in series. The fifth transistor switch QA, the sixth transistor switch QB, the seventh transistor switch QC, and the eighth transistor switch QD receive the input DC voltage Vdc through the first input 203, the second input 204, and the input inductor 207 and convert the input DC voltage Vdc into the input DC current.

According to the embodiments provided above, the DC voltage conversion device keeps on turning on the first transistor switch. When the third transistor switch is turned off, the voltage drop across the fourth transistor switch is zero, thereby achieving zero voltage switching, increasing a full-load efficiency by about 1%, and reducing the ripple of the output voltage, noise disturbance, and the voltage-withstanding capabilities of power transistors.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A direct-current (DC) voltage conversion device comprising:
    an energy providing circuit, having a first terminal and a second terminal, configured to receive an input direct-current (DC) voltage to store energy;
    a first transistor switch coupled between the second terminal and a first output, wherein the first transistor switch is turned on;
    a second transistor switch coupled between the second terminal and a second output, wherein the second transistor switch is turned off, and the energy providing circuit is configured to use the energy to charge parasitic capacitance of the second transistor switch;
    a third transistor switch coupled between the first terminal and the second output;
    a fourth transistor switch coupled between the first terminal and the first output, wherein a node of the fourth transistor switch coupled to the first terminal of the energy providing circuit is coupled to the third transistor switch, and the fourth transistor switch is turned off; and
    an output capacitor coupled between the first output and the second output, wherein when the third transistor switch is turned on, the parasitic capacitance discharges the output capacitor to generate a discharging current, and the energy providing circuit receives the discharging current to store energy through the first transistor switch, the output capacitor, and the third transistor switch, thereby establishing same voltage drops across the parasitic capacitance and the output capacitor;
    wherein after establishing the same voltage drops across the parasitic capacitance and the output capacitor, the third transistor switch is turned off and the parasitic capacitance of the second transistor switch is driven to charge parasitic capacitance of the fourth transistor switch, thereby establishing a zero voltage drop across the fourth transistor switch.

2. The DC voltage conversion device according to claim 1, wherein the energy providing circuit comprises:
    a current switching circuit configured to receive the input DC voltage and convert the input DC voltage into an input direct-current (DC) current; and
    a transformer with a primary side thereof coupled to the current switching circuit, and a secondary side of the transformer has the first terminal and the second terminal, wherein the primary side of the transformer is configured to receive the input DC current to store energy and use the energy to charge the parasitic capacitance of the second transistor switch, a winding of the secondary side is configured to receive the charging current to store energy through the first transistor switch, the output capacitor, and the third transistor switch, and when the third transistor switch is turned off, the parasitic capacitance of the second transistor switch is driven to charge the parasitic capacitance of the fourth transistor switch through the winding of the secondary side.

3. The DC voltage conversion device according to claim 2, wherein the primary side of the transformer has a third terminal and a fourth terminal, and the current switching circuit comprises:
    a fifth transistor switch coupled between a first input and the third terminal;
    a sixth transistor switch coupled between a second input and the third terminal;
    a seventh transistor switch coupled between the second input and the fourth terminal; and
    an eighth transistor switch coupled between the first input and the fourth terminal, wherein the fifth transistor switch, the sixth transistor switch, the seventh transistor switch, and the eighth transistor switch are configured to receive the input DC voltage and convert the input DC voltage into the input DC current through the first input and the second input.

4. The DC voltage conversion device according to claim 3, wherein the fifth transistor switch, the sixth transistor switch, the seventh transistor switch, and the eighth transistor switch are N-channel metal-oxide-semiconductor field effect transistors.

5. The DC voltage conversion device according to claim 3, wherein the current switching circuit further comprises an input capacitor coupled between the first input and the second input and configured to stabilize the input DC voltage.

6. The DC voltage conversion device according to claim 3, wherein the current switching circuit further comprises an active clamped circuit coupled between the first input and the second input and configured to clamp the input DC voltage.

7. The DC voltage conversion device according to claim 6, wherein the active clamped circuit comprises a clamping capacitor and a ninth transistor switch, and the clamping capacitor is coupled to the ninth transistor switch in series.

8. The DC voltage conversion device according to claim 6, wherein the current switching circuit further comprises an input inductor with an end thereof coupled to the first input, and another end of the input inductor is coupled to the active clamped circuit, the fifth transistor switch, and the eighth transistor switch, and the fifth transistor switch, the sixth transistor switch, the seventh transistor switch, and the eighth transistor switch are configured to receive the input DC voltage through the input inductor.

9. The DC voltage conversion device according to claim 1, further comprising a resonant inductor coupled between the first terminal and the node, the resonant inductor is configured to receive the charging current to store energy through the first transistor switch, the output capacitor, and the third transistor switch, and when the third transistor switch is turned off, the parasitic capacitance of the second transistor switch is driven to charge the parasitic capacitance of the fourth transistor switch through the resonant inductor.

10. The DC voltage conversion device according to claim 1, wherein the first transistor switch, the second transistor switch, the third transistor switch, and the fourth transistor switch are N-channel metal-oxide-semiconductor field effect transistors, and the parasitic capacitances of the second transistor switch and the second transistor switch are parasitic drain-source capacitances.

* * * * *